United States Patent
Zheng et al.

(10) Patent No.: US 9,294,784 B2
(45) Date of Patent: Mar. 22, 2016

(54) METHOD AND APPARATUS FOR REGION-BASED FILTER PARAMETER SELECTION FOR DE-ARTIFACT FILTERING

(75) Inventors: Yunfei Zheng, San Diego, CA (US); Qian Xu, Folsom, CA (US); Joel Sole, La Jolla, CA (US); Peng Yin, Ithaca, NY (US); Xiaoan Lu, Princeton, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 763 days.

(21) Appl. No.: 13/138,626

(22) PCT Filed: Mar. 10, 2010

(86) PCT No.: PCT/US2010/000715
§ 371 (c)(1),
(2), (4) Date: Sep. 12, 2011

(87) PCT Pub. No.: WO2010/104570
PCT Pub. Date: Sep. 16, 2010

(65) Prior Publication Data
US 2012/0002722 A1    Jan. 5, 2012

Related U.S. Application Data

(60) Provisional application No. 61/159,573, filed on Mar. 12, 2009.

(51) Int. Cl.
H04N 19/82    (2014.01)
H04N 19/70    (2014.01)
(Continued)

(52) U.S. Cl.
CPC ............. *H04N 19/82* (2014.11); *H04N 19/117* (2014.11); *H04N 19/14* (2014.11); *H04N 19/147* (2014.11);
(Continued)

(58) Field of Classification Search
CPC . H04N 19/117; H04N 19/119; H04N 19/136; H04N 19/17; H04N 19/66; H04N 16/80; H04N 19/85
See application file for complete search history.

(56) References Cited

U.S. PATENT DOCUMENTS

| 5,771,318 A * | 6/1998 | Fang et al. ................. 382/261 |
| 2007/0002151 A1* | 1/2007 | Ozaki ........................ 348/251 |

(Continued)

FOREIGN PATENT DOCUMENTS

| WO | WO2007/111292 A1 | 10/2007 |
| WO | WO2008/016605 | 2/2008 |

(Continued)

OTHER PUBLICATIONS

Guleryuz O. "A nonlinear loop filter for quantization noise removal in hybrid video compression", Image Processing, IEEE, vol. 2, Sep. 11, 2005, pp. 333-336, XP010851057.

(Continued)

*Primary Examiner* — Geepy Pe
(74) *Attorney, Agent, or Firm* — Robert D. Shedd; Julia Tanase (57) ABSTRACT

Methods and apparatus are provided for region-based filter parameter selection for de-artifact filtering. An apparatus includes an encoder for encoding picture data for at least a region of a picture. The encoder includes a de-artifact filter for performing de-artifact filtering on the region using region-based filter parameter selection. The region includes any of a non-block-boundary, a block boundary, a combination thereof, and the non-block-boundary to an exclusion of any block boundaries.

17 Claims, 5 Drawing Sheets

(51) Int. Cl.
  *H04N 19/147* (2014.01)
  *H04N 19/196* (2014.01)
  *H04N 19/61* (2014.01)
  *H04N 19/117* (2014.01)
  *H04N 19/14* (2014.01)
  *H04N 19/17* (2014.01)
  *H04N 19/192* (2014.01)

(52) U.S. Cl.
  CPC .............. *H04N 19/17* (2014.11); *H04N 19/192* (2014.11); *H04N 19/196* (2014.11); *H04N 19/61* (2014.11); *H04N 19/70* (2014.11)

(56) References Cited

U.S. PATENT DOCUMENTS

2007/0013794 A1* 1/2007 Tsuruoka ..................... 348/241
2010/0128803 A1* 5/2010 Divorra Escoda et al. ........................ 375/240.29
2012/0189217 A1 7/2012 Wittmann et al.

FOREIGN PATENT DOCUMENTS

WO WO2008/057308 5/2008
WO WO2008/153856 12/2008

OTHER PUBLICATIONS

Huang et al "Improved Quadtree-based Adaptive Loop Filter", VCEG Meeting, 89 MPEG Meeting, No. VCEG.AL24, Jul. 5, 2009, pp. 1-7, XP030003705.

Yu et al. "Unified Loop Filter for Video Coding", 91. MPEG Meeting Kyoto, Japan, Jan. 16, 2010, No. M17171, XP030045761.

Camilo C. Dorea et al: "A direction-adaptive in-loop deartifacting filter for video coding" Image Processing 2008, 15$^{th}$ IEEE Conference, Piscataway, NJ, USA, Oct. 12, 2008, pp. 1624-1627, XP031374329.

Bjontegaard G et al: "Adaptive deblocking filter", IEEE Transactions on Circuits and Systems for Video Technology, Piscataway, NJ, USA, Jul. 1, 2003, pp. 614-619, XP011099254.

Yuri Vatis et al: "Syntax of adaptive filter coefficients in the KTA reference model" ITU Study Group 16—Video Coding Experts Group, No. VCEG-AF09, May 2, 2007, p. 3, XP030003530.

Search Report from EPO dated Jul. 21, 2010.

ITU-T H.264, "Advanced Video Coding for Generic Audiovisual Services," Series H: Audiovisual and Multimedia Systems, International Telecommunications Union, Mar. 2005.

* cited by examiner

METHOD AND APPARATUS FOR REGION-BASED FILTER PARAMETER SELECTION FOR DE-ARTIFACT FILTERING

CROSS-REFERENCE TO RELATED APPLICATIONS

This application claims the benefit, under 35 U.S.C. §365 of International Application PCT/US2010/000,715 and filed Mar. 10, 2010, which was published in accordance with PCT Article 21(2) on Sep. 6, 2010, in English and which claims the benefit of U.S. provisional patent application No. 61/159,573, filed Mar. 12, 2009.

TECHNICAL FIELD

The present principles relate generally to video encoding and decoding and, more particularly, to methods and apparatus for region-based filter parameter selection for de-artifact filtering.

BACKGROUND

Video coding standards employ block-based transforms (for example, the ubiquitous discrete cosine transform, or DCT) and motion compensation to achieve compression efficiency. Coarse quantization of the transform coefficients and the use of different reference locations or different reference pictures by neighboring blocks in motion-compensated prediction can give rise to visually disturbing artifacts such as distortion around edges, textures or block discontinuities. In the state-of-the-art International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), an adaptive de-blocking filter is introduced to combat the artifacts arising along block boundaries.

More general de-artifacting approaches have been proposed to combat artifacts not only on block discontinuities but also around image singularities (e.g., edges and/or textures), wherever these may appear. In a first prior art approach, in order to maximize performance, the threshold for de-artifacting filters must consider local encoding conditions imposed by the video coding procedure. For instance, within a single frame, the MPEG-4 AVC Standard offers various prediction modes (intra, inter, skip, and so forth) each of which is subject to distinct quantization noise statistics and corresponding filtering demands. Thus, in the first prior art approach, the threshold is adapted based on the coding modes and quantization parameter (QP). However, the threshold in the first prior art approach does not take the video content itself into account.

Deblocking Filter in the MPEG-4 AVC Standard

Within the state-of-the-art MPEG-4 AVC Standard, an in-loop deblocking filter has been adopted. The filter acts to attenuate artifacts arising along block boundaries. Such artifacts are caused by coarse quantization of the transform (DCT) coefficients as well as motion compensated prediction. By adaptively applying low-pass filters to the block edges, the deblocking filter can improve both subjective and objective video quality. The filter operates by performing an analysis of the samples around a block edge and adapts filtering strength to attenuate small intensity differences attributable to blocky artifacts while preserving the generally larger intensity differences pertaining to the actual image content. Several block coding modes and conditions also serve to indicate the strength with which the filters are applied. These include inter/intra prediction decisions, the presence of coded residuals and motion differences between adjacent blocks. Besides adaptability on the block-level, the deblocking filter is also adaptive at the slice-level and the sample-level. On the slice level, filtering strength can be adjusted to the individual characteristics of the video sequence. On the sample level, filtering can be turned off at each individual sample depending on sample value and quantizer-based thresholds.

The blocky artifacts removed by the MPEG-4 AVC Standard deblocking filter are not the only artifacts that present in compressed video. Coarse quantization is also responsible for other artifacts such as ringing, edge distortion, or texture corruption. The deblocking filter cannot reduce artifacts caused by quantization errors which appear inside a block. Moreover, the low-pass filtering techniques employed in deblocking assume a smooth image model and are not suited for processing image singularities such as edges or textures.

Sparsity-Based De-Artifacting

Inspired by the sparsity-based de-noising techniques, a nonlinear in-loop filter has been proposed for compression de-artifacting as noted above with respect to the first prior art approach. The first prior art approach uses a set of de-noised estimates provided by an over-complete set of transforms. The implementation of the first prior art approach generates an over-complete set of transforms by using all possible translations $H_i$ of a given two dimensional (2D) orthonormal transform H, such as wavelets or DCT. Thus, given an image I, a series of different transformed versions $Y_i$ of the image I is created by applying the various transforms $H_i$. Each transformed version $Y_i$ is then subject to a de-noising procedure, typically involving a thresholding operation, producing the series of $Y'_i$. The transformed and thresholded coefficients $Y'_i$ are then inverse transformed back into the spatial domain, giving rise to the de-noised estimates $I'_i$. In over-complete settings, it is expected that some of the de-noised estimates will provide better performance than others and that the final filtered version I' will benefit from a combination via averaging of such de-noised estimates. The first prior art approach de-noising filter proposes the weighted averaging of de-noised estimates $I'_i$ where the weights are optimized to emphasize the best de-noised estimates.

For de-artifacting work, a choice of filtering parameters, such as, for example, threshold, is of great importance. The applied threshold plays a crucial part in controlling the de-noising capacity of the filter as well as in computing the averaging weights used in emphasizing the better de-noising estimates. Inadequate threshold selection may result in over-smoothed reconstructed pictures or may allow the persistence of artifacts. In the first prior art approach, selected thresholds per pixel class based on quantization parameter (QP) and coding mode information are encoded and transmitted as side information to the decoder. The threshold does not adapt based on the video content.

Video content varies both spatially and temporally. The noise or artifacts level of a video sequence under the same quantization parameter (QP) or coding mode can be very different, which calls for different filtering parameters.

SUMMARY

These and other drawbacks and disadvantages of the prior art are addressed by the present principles, which are directed to methods and apparatus for region-based filter parameter selection for de-artifact filtering.

According to an aspect of the present principles, there is provided an apparatus. The apparatus includes an encoder for encoding picture data for at least a region of a picture. The encoder includes a de-artifact filter for performing de-artifact filtering on the region using region-based filter parameter selection. The region includes any of a non-block-boundary, a block boundary, a combination thereof, and the non-block-boundary to an exclusion of any block boundaries.

According to another aspect of the present principles, there is provided a method. The method includes encoding picture data for at least a region of a picture. The encoding step includes performing de-artifact filtering on the region using region-based filter parameter selection. The region includes any of a non-block-boundary, a block boundary, a combination thereof, and the non-block-boundary to an exclusion of any block boundaries.

According to yet another aspect of the present principles, there is provided a decoder for decoding picture data for at least a region of a picture. The decoder includes a de-artifact filter for performing de-artifact filtering on the region using region-based filter parameter selection. The region includes any of a non-block-boundary, a block boundary, a combination thereof, and the non-block-boundary to an exclusion of any block boundaries.

According to a further aspect of the present principles, there is provided a method. The method includes decoding picture data for at least a region of a picture. The decoding step includes performing de-artifact filtering on the region using region-based filter parameter selection. The region includes any of a non-block-boundary, a block boundary, a combination thereof, and the non-block-boundary to an exclusion of any block boundaries.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for region-based filter parameter selection for de-artifact filtering.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", Such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Additionally, it is to be appreciated that while one or more embodiments of the present principles are described herein with respect to a thresholding parameter, the present principles are not limited to only threshold parameters with respect to filter parameters to which the present principles may be applied and, thus, may be applied to any other filter parameters as readily determined by one of skill in this and related arts, while maintaining the spirit of the present principles.

Further, as used herein, the words "picture" and "image" are used interchangeably and refer to a still image or a picture from a video sequence. As is known, a picture may be a frame or a field.

Also, as used herein, the word "signal" refers to, among other things, indicating something to a corresponding decoder. For example, the encoder may signal a particular one of a plurality of parameters for region-based filter parameter selection for de-artifact filtering. In this way, the same parameter may be used at both the encoder side and the decoder side. Thus, for example, an encoder may transmit a particular parameter to the decoder so that the decoder may use the same particular parameter or, if the decoder already has the particular parameter as well as others, then signaling may be used (without transmitting) to simply allow the decoder to know and select the particular parameter. By avoiding transmission of any actual functions, a bit savings may be realized. It is to be appreciated that signaling may be accomplished in a variety of ways. For example, one or more syntax elements, flags, and so forth may be used to signal information to a corresponding decoder. While the preceding relates to the verb form of the word "signal", the word "signal" may also be used herein as a noun.

Additionally, as used herein, the phrase "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Moreover, as used herein, the phrase "region-based parameter selection" refers to any of a selection, adjustment, and/or adaptation of a parameter based on picture region (which may, in turn, rely upon features of the picture region).

Further, as used herein, the phrase "picture region" (or simply "region" for short") refers to a portion of a picture encompassing and/or otherwise formulated from, for example, one or more blocks or arbitrary shapes of any size. The one or more blocks may relate to, for example, a super macroblock, a macroblock, a macroblock partition, a sub-macroblock partition, and so forth. Moreover, contrary to a conventional de-blocking filter which is limited to block boundaries, a picture region in accordance with the present principles is capable of involving a non-block-boundary as well as block boundaries. That is, in some embodiments, a picture region may involve only a non-block-boundary (i.e., to the exclusion of any block boundaries). Thus, regions other than block boundaries may advantageously be filtered to remove or reduce artifacts there from.

Also, as used herein, the phrase "region indication" refers to an indication of a region in a picture to which the present principles may be applied. For example, a region indication may be used to signal and/or otherwise identify a particular portion of a picture to which region-based filter parameter selection may be applied in accordance with the present principles.

Figure 1:
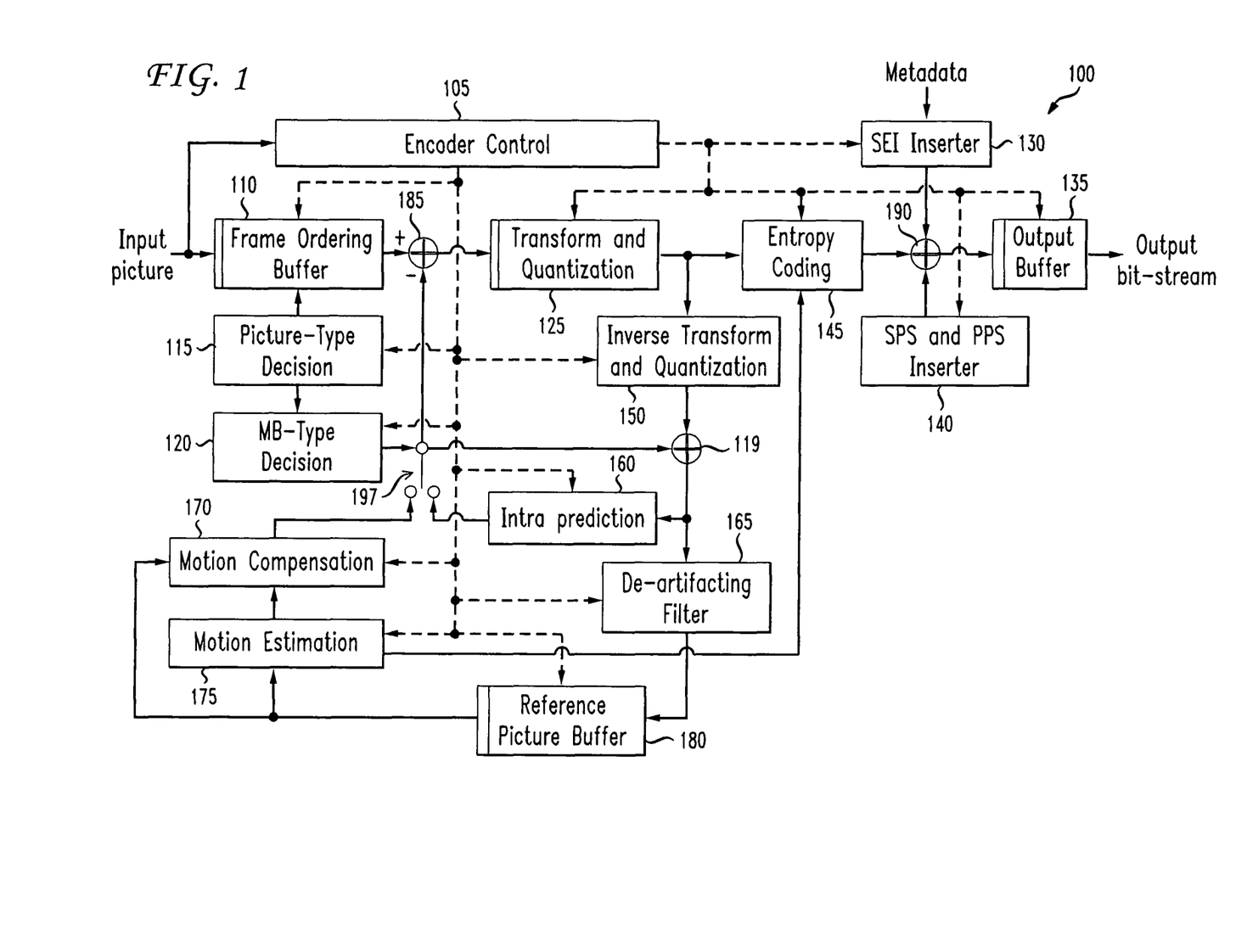
FIG. 1 is a block diagram showing an exemplary video encoder to which the present principles may be applied, in accordance with an embodiment of the present principles.

Turning to FIG. 1, a video encoder capable of performing video encoding in accordance with the present principles is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a de-artifacting filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the de-artifacting filter 165. An output of the de-artifacting filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
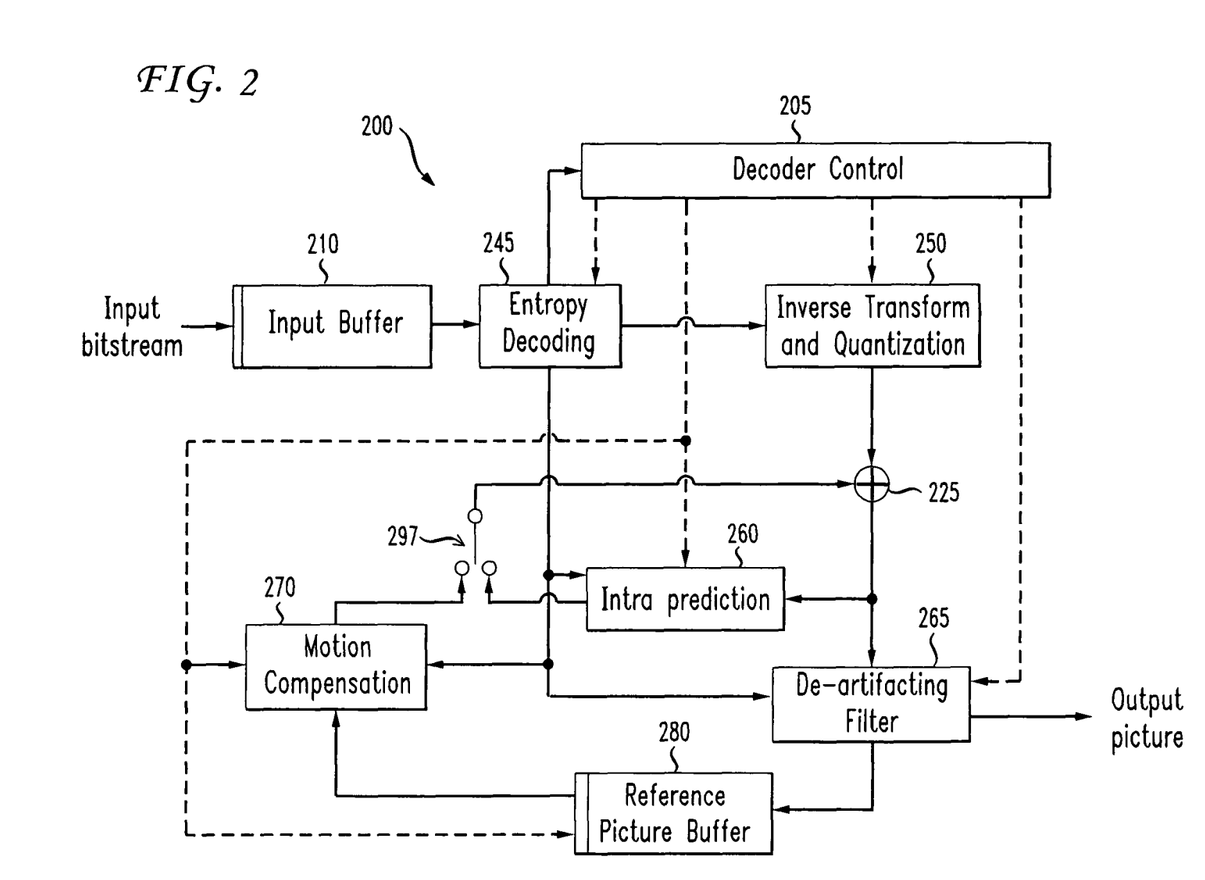
FIG. 2 is a block diagram showing an exemplary video decoder to which the present principles may be applied, in accordance with an embodiment of the present principles.

Turning to FIG. 2, a video decoder capable of performing video decoding in accordance with the present principles is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a de-artifacting filter 265 and a first input of an intra prediction module 260. A second output of the de-artifacting filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the de-artifacting filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the de-artifacting filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the de-artifacting filter 265 is available as an output of the decoder 200, for outputting an output picture.

As noted above, the present principles are directed to methods and apparatus for region-based filter parameter selection for de-artifact filtering. Advantageously, the present principles provide improved filtering parameter adjustment (meaning parameter selection or adaptation) based on video content. Filtering parameter adjustment is important for sparsity-based de-artifacting filter. In an embodiment, we use a region-based parameter selection approach, which increases coding efficiency when compared to the state of the art sparsity-based de-artifacting filter.

In a particular embodiment, we use a block-based filter parameter adjustment to improve sparsity-based de-artifacting filter performance in video compression. More specifically, we will adapt the filter parameters not only based on the quantization parameter (QP) and coding information, but also based on the regions of video sequences. The principle is to adapt the parameters more closely to the content itself. We will use the MPEG-4 AVC Standard and a thresholding parameter as an example to explain one exemplary implementation of the present principles. However, as noted above, it is to be appreciated that the present principles are not limited to any particular video coding standards and/or recommendations and, thus, may be applied to any other video coding standard and/or recommendation and/or extension thereof, while maintaining the spirit of the present principles. Moreover, it is to be appreciated that the present principles are not limited solely to the use of a thresholding parameter with respect to region-based filter parameter selection and, thus, other filter parameters may also be utilized in accordance with the present principles, while maintaining the spirit of the present principles.

In an embodiment, the region is block, and can have a variable block size, including, but not limited to, 64×64, 128×128, 256×256, 512×512, and so forth. The block size may be signaled using, for example, a high level syntax element. Such a high level syntax element may reside, but is not limited to, for example, within the slice header for each slice. Of course, it is to be appreciated that the present principles are not limited solely to blocks and, thus, other picture partition sizes and shapes may be used, while maintaining the spirit of the present principles.

In an embodiment, for each block, the filter parameter for each class is signaled to indicate the parameter value used for sparsity-based de-artifact filtering for this block. The parameter can be signaled using, for example, a high level syntax element. Such a high level syntax element may reside, but is not limited to, at the slice header or at the block level. In an embodiment, to save the overhead for signaling the parameter, several methods can be applied.

In an embodiment, a unique parameter table for each class, that is based on the quantization parameter (QP) and coding information, is stored in both the encoder and decoder. For each block, we simply signal the scaling factor.

Alternatively, in an embodiment, the parameter is adapted based on the statistics of the current block. The statistics can be, for example, local variance before the de-artifact filtering (which does not need to be signaled), and/or the variance of noise (which should be signaled).

In another embodiment, a set of parameters for each class is stored at both the encoder and decoder. For each block, we simply signal the index for each class.

In another embodiment, a flag is used to indicate whether parameter adaptation is applied.

It is to be appreciated that the above methods and variations can be applied to luminance or/and chrominance, while maintaining the spirit of the present principles.

TABLE 1 illustrates slice header syntax in accordance with an embodiment of the present principles.

TABLE 1

| slice_header( ) { | Descriptor |
|---|---|
| ... | |
| block_adaptive_flag | u(1) |
| if(block_adaptive_control_flag==1) { | |
| block_size_idx | u(3) |
| for(i = 0; i < num_of_block; i ++) { | |
| parameter_adaptive_flag [i] | u(1) |
| if(parameter_adaptive_flag==1) { | |
| for (j=0; j<num_of_classes; j++) { | |
| parameter_idx [i][j] | u(4) |
| } | |
| } | |
| } | |
| } | |
| ... | |
| } | |

The semantics for at least some of the syntax elements of TABLE 1 are as follows:

block_adaptive_flag equal to 1 specifies that block-based parameter adaptation is used for the slice. block_adaptive_flag equal to 0 specifies that block-based parameter adaptation is not used for the slice.

block_size_idx specifies the size of the block.

parameter adaptive_flag [i] equal to 1 specifies that parameter adaptation is used for block i. parameter_adaptive_flag equal to 0 specifies that parameter adaptation is not used for block i.

parameter_idx [i][j] specifies the parameter index for block i and class j.

Figure 3:
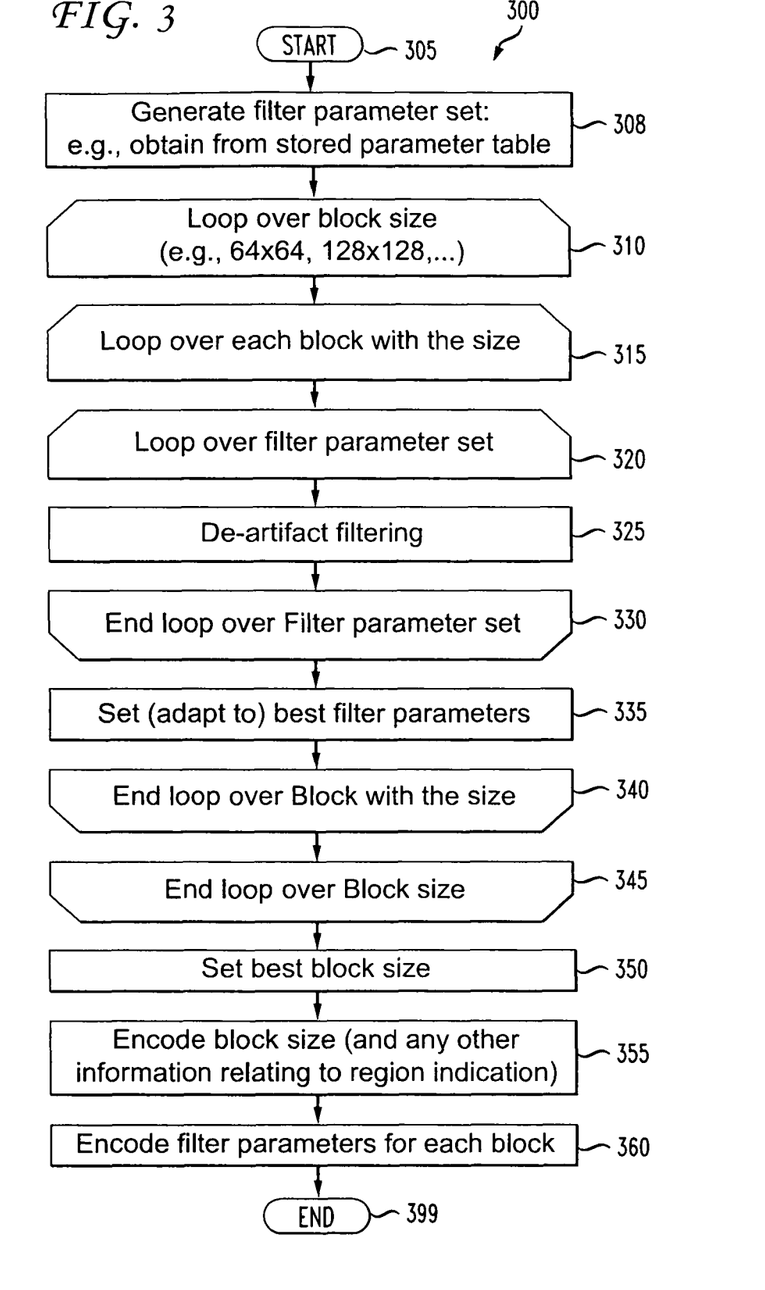
FIG. 3 is a flow diagram showing an exemplary method for region-based filter parameter selection for de-artifact filtering in a video encoder, in accordance with an embodiment of the present principles.

Turning to FIG. 3, an exemplary method for region-based filter parameter selection for de-artifact filtering in a video encoder is indicated generally by the reference numeral 300. The method 300 includes a start block 305 that passes control to a function block 308. The function block 308 generates a filter parameter set (which may involve, but is not limited to, for example, obtaining the filter parameter set from a stored parameter table), and passes control to a loop limit block 310. The loop limit block 310 begins a loop over each block size (which may be, for example, but is not limited to, 64×64, 128×128, etc.), and passes control to a loop limit block 315. The loop limit block 315 begins a loop over each block (with the specified block size as per loop limit block 310), and passes control to a loop limit block 320. The loop limit block 320 begins a loop over a filter parameter set, and passes control to a function block 325. The function block 325 performs de-artifact filtering, and passes control to a loop limit block 330. The loop limit block 330 ends the loop over the filter parameter set, and passes control to a function block 335. The function block 335 sets (adapts to) the best filter parameters, and passes control to a loop limit block 340. The loop limit block 340 ends the loop over each block (with the specified size), and passes control to a loop limit block 345. The loop limit block 345 ends the loop over each block size, and passes control to a function block 350. The function block 350 sets the best block size, and passes control to a function block 355. The function block 355 encodes the block size, and passes control to a function block 360. The function block 360 encodes the filter parameters for each block, and passes control to an end block 399.

Figure 4:
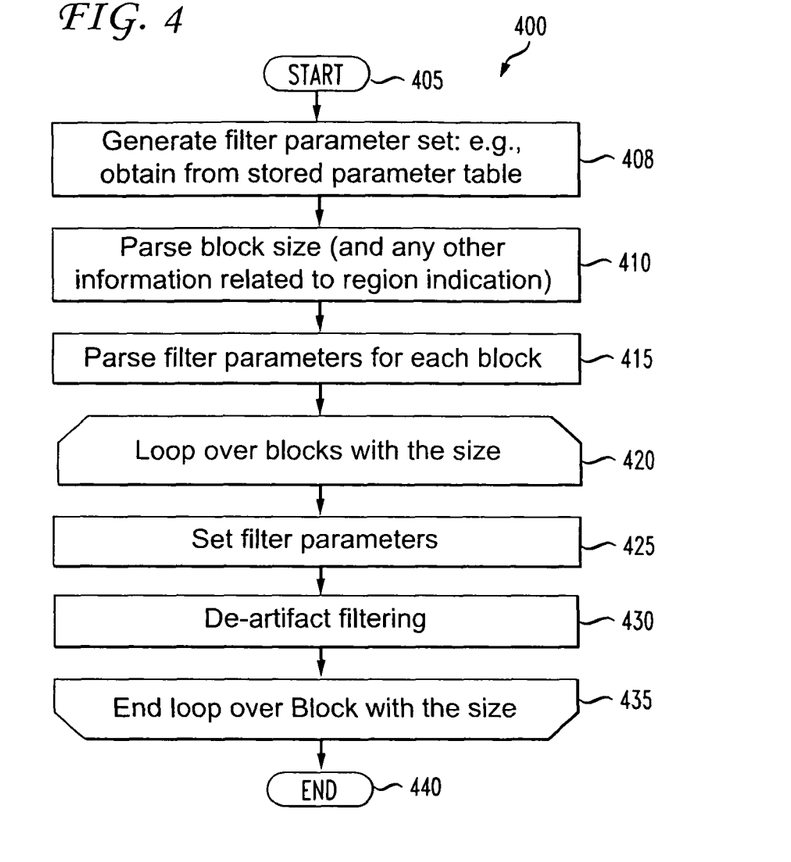
FIG. 4 is a flow diagram showing an exemplary method for region-based filter parameter selection for de-artifact filtering in a video decoder, in accordance with an embodiment of the present principles.

Turning to FIG. 4, an exemplary method for region-based filter parameter selection for de-artifact filtering in a video decoder is indicated generally by the reference numeral 400. The method 400 includes a start block 405 that passes control to a function block 408. The function block 408 generates a filter parameter set (which may involve, but is not limited to, for example, obtaining the filter parameter set from a stored parameter table), and passes control to a function block 410. The function block 410 parses the block size, and passes control to a function block 415. The function block 415 parses the filter parameters for each block, and passes control to a loop limit block 420. The loop limit block 420 begins a loop over each block (with the specified block size as per loop limit block 410), and passes control to a function block 425. The function block 425 sets the filter parameters, and passes control to a function block 430. The function block 430 performs de-artifact filtering, and passes control to a loop limit block 435. The loop limit block 435 ends the loop over each block (with the specified size), and passes control to an end block 499.

Figure 5:
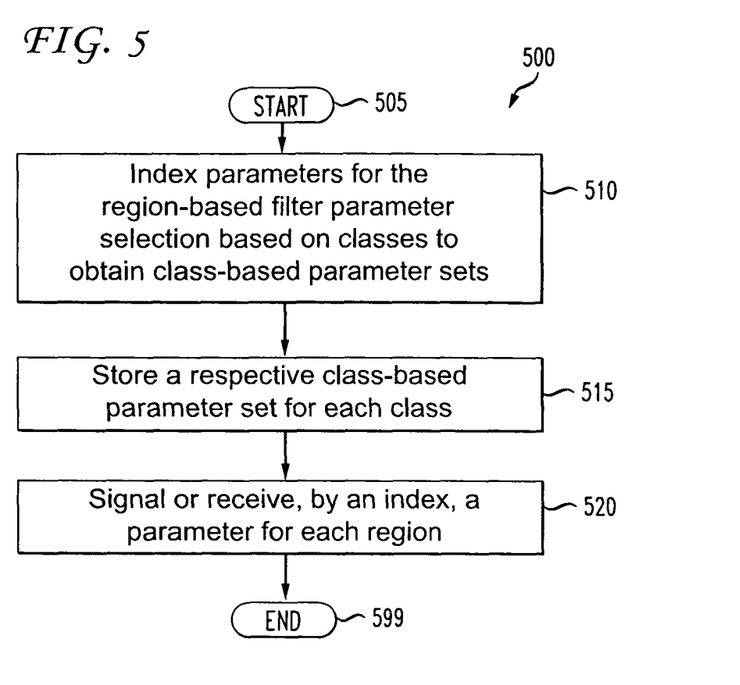
FIG. 5 is a flow diagram showing an exemplary method for class-based filter parameter selection for de-artifact filtering in a video encoder and/or a video decoder, in accordance with an embodiment of the present principles.

Turning to FIG. 5, an exemplary method for class-based filter parameter selection for de-artifact filtering in a video encoder and/or a video decoder is indicated generally by the reference numeral 500. It is to be appreciated that the parameters described with respect to method 500, while described as class-based, are also region-based, as is readily evident to one of ordinary skill in this and related arts. The method 500 includes a start block 505 that passes control to a function block 510. The function block 510 indexes parameters for region-based filter parameter selection based on classes to obtain class-based parameter sets, and passes control to a function block 515. The function block 515 stores a respective class-based parameter set for each class, and passes control to a function block 520. The function block 520 signals, by an index, a parameter for each region, and passes control to an end block 599. As would be readily apparent to one of ordinary skill in this and related arts, function block 520 performs signaling (as in signaling, by an index, a parameter for each region) when implemented at an encoder, and performs receiving (as in receiving, by an index, a parameter for each region).

A description will now be given of some of the many attendant advantages/features of the present invention, some of which have been mentioned above. For example, one advantage/feature is an apparatus having an encoder for encoding picture data for at least a region of a picture. The encoder includes a de-artifact filter for performing de-artifact filtering on the region using region-based filter parameter selection. The region includes any of a non-block-boundary, a block boundary, a combination thereof, and the non-block-boundary to an exclusion of any block boundaries.

Another advantage/feature is the apparatus having the encoder as described above, wherein the region-based filter parameter selection is combined with region-based filter parameter adaptation based on at least quantization noise and coding information relating to the region.

Yet another advantage/feature is the apparatus having the encoder as described above, wherein at least one of a region indication and a filter parameter is signaled using at least one of a high level syntax element and a block level syntax element.

Still another advantage/feature is the apparatus having the encoder as described above, wherein the region is capable of having various block sizes and shapes.

Moreover, another advantage/feature is the apparatus having the encoder as described above, wherein the picture data is encoded for a plurality of regions of the picture. The encoder stores a unique parameter table, adapts a parameter from the unique parameter table to each of the plurality of regions, and signals the parameter using a scaling factor.

Further, another advantage/feature is the apparatus having the encoder as described above, wherein the picture data is encoded for a plurality of regions of the picture. The encoder adapts a parameter to each of the plurality of regions based on content statistics, and abstains from signaling the parameter to a corresponding decoder.

Also, another advantage/feature is the apparatus having the encoder as described above, wherein the picture data is encoded for a plurality of regions of the picture. Each of a plurality of parameters for the region-based filter parameter selection is indexed based on a plurality of classes to obtain a plurality of class-based parameter sets. A respective one of the plurality of class-based parameter sets is stored for each of the plurality of classes. A parameter for each of the plurality of regions is signaled by an index.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a region of a picture, the encoder comprising
a de-artifact filter configured to select at least a region-based filter parameter based on the region and to perform de-artifact filtering on the region using the region-based filter parameter,
wherein the encoder adapts the region-based filter parameter before de-artifact filtering based on local variance of the region, and
wherein the encoder does not signal the local variance when the region-based filter parameter is adapted based on local variance.

2. The apparatus of claim 1, wherein the region-based filter parameter is selected based on quantization noise and coding information relating to the region.

3. The apparatus of claim 1, wherein the picture data is encoded for a plurality of regions of the picture, and said encoder adapts a parameter to each of the plurality of regions based on content statistics, and abstains from signaling the parameter to a corresponding decoder.

4. The apparatus of claim 1, wherein the picture data is encoded for a plurality of regions of the picture,
wherein the encoder is configured to store a set of filter parameters for each of one or more pixel classes, and
wherein the encoder is configured to select, for each of the plurality of regions, at least a first region-based filter parameter from the set of filter parameters for each of the one or more pixel classes, and
wherein the encoder is configured to signal an index of the selected first region-based filter parameter for each of the plurality of regions, and
wherein the encoder is configured to use the selected first region-based filter parameter in de-artifact filtering.

5. A method, comprising:
encoding picture data for at least a region of a picture,
wherein said encoding comprises selecting at least a region-based filter parameter for the region and performing de-artifact filtering on the region using the region-based filter parameter,
wherein the region-based filter parameter is adapted before de-artifact filtering based on local variance of the region, and
wherein the local variance is not signaled when the region-based filter parameter is adapted based on local variance.

6. The method of claim 5, wherein the region-based filter parameter is selected based on quantization noise and coding information relating to the region.

7. The method of claim 5, wherein the picture data is encoded for a plurality of regions of the picture, and said encoding step comprises:
adapting a parameter to each of the plurality of regions based on content statistics; and
abstaining from signaling the parameter to a corresponding decoder.

8. The method of claim 5, wherein the picture data is encoded for a plurality of regions of the picture, wherein a set of filter parameters for each of one or more pixel classes are stored, and wherein, for each of the plurality of regions, at least a first region-based filter parameter is selected from the set of filter parameters for each of the one or more pixel classes, and wherein an index of the selected first region-based filter parameter is signaled for each of the plurality of regions, and wherein the selected first region-based filter parameter is used in de-artifact filtering.

9. An apparatus, comprising:
a decoder for decoding picture data for at least a region of a picture,
wherein said decoder comprises a de-artifact filter for performing de-artifact filtering on the region using at least a region-based filter parameter selected for the region, and
wherein the decoder adapts the region-based filter parameter before de-artifact filtering based on local variance of the region when the region-based filter parameter is not signaled in a bit stream.

10. The apparatus of claim 9, wherein the region-based filter parameter is selected based on quantization noise and coding information relating to the region.

11. The apparatus of claim 9, wherein the region is capable of having various block sizes and shapes.

12. The apparatus of claim 9, wherein the picture data is decoded for a plurality of regions of the picture,
wherein the decoder is configured to store a set of filter parameters for each of one or more pixel classes, and
wherein the decoder is configured to receive at least an index, for each of the plurality of regions, for at least a first region-based filter parameter selected from the set of filter parameters for each of the one or more pixel classes, and
wherein the decoder is configured to use the selected first region-based filter parameter in de-artifact filtering.

13. The apparatus of claim 9, wherein the picture data is decoded for a plurality of regions of the picture, and said decoder adapts a parameter to each of the plurality of regions based on content statistics in an absence of any signaling of the parameter from a corresponding encoder.

14. The apparatus of claim 9, wherein the picture data is decoded for a plurality of regions of the picture, each of a plurality of parameters for the region-based filter parameter selection is indexed based on a plurality of classes to obtain a plurality of class-based parameter sets, a respective one of the plurality of class-based parameter sets is stored for each of the plurality of classes, and said decoder receives an index to a parameter for each of the plurality of regions.

15. A method, comprising:
decoding picture data for at least a region of a picture,
wherein said decoding comprises performing de-artifact filtering on the region using at least a region-based filter parameter selected for the region, and
wherein the region-based filter parameter is adapted before de-artifact filtering based on local variance of the region when the region-based filter parameter is not signaled in a bit stream.

16. The method of claim 15, wherein the region-based filter parameter is selected based on quantization noise and coding information relating to the region.

17. A non-transitory computer readable storage media having video signal data encoded thereupon, the non-transitory computer readable storage media configured to perform:
decoding picture data for at least a region of a picture,
wherein said decoding comprises performing de-artifact filtering on the region using at least a region-based filter parameter selected for the region, and
wherein the region-based filter parameter is adapted before de-artifact filtering based on local variance of the region when the region-based filter parameter is not signaled in a bit stream.

* * * * *